US006807256B1

(12) United States Patent
Holt et al.

(10) Patent No.: US 6,807,256 B1
(45) Date of Patent: Oct. 19, 2004

(54) CALL SCREENING METHOD AND APPARATUS

(75) Inventors: Scott C. Holt, Smyrna, GA (US); M. Scott Laster, Atlanta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/530,124

(22) PCT Filed: Oct. 27, 1998

(86) PCT No.: PCT/US98/22736
§ 371 (c)(1),
(2), (4) Date: Apr. 24, 2000

(87) PCT Pub. No.: WO99/23845
PCT Pub. Date: May 14, 1999

Related U.S. Application Data
(60) Provisional application No. 60/064,201, filed on Nov. 4, 1997.

(51) Int. Cl.[7] .............................. H04M 1/64; H04M 3/42
(52) U.S. Cl. ........................ 379/88.19; 379/70; 455/415
(58) Field of Search ........................... 379/88.21–88.26, 379/142.01; 455/415, 445, 567

(56) References Cited

U.S. PATENT DOCUMENTS

| | | |
|---|---|---|
| 4,644,107 A | 2/1987 | Clowes et al. |
| 4,893,335 A | 1/1990 | Fuller et al. |
| 4,942,598 A | 7/1990 | Davis |
| 5,063,588 A | 11/1991 | Patsiokas et al. |
| 5,204,894 A | 4/1993 | Darden |
| 5,274,699 A | 12/1993 | Ranz |
| 5,349,636 A | 9/1994 | Irribarren |
| 5,353,328 A | 10/1994 | Jokimies |
| 5,371,901 A | 12/1994 | Reed et al. |
| 5,375,161 A | 12/1994 | Fuller et al. |
| 5,452,340 A | 9/1995 | Engelbeck et al. |
| 5,473,671 A | 12/1995 | Partridge, III |
| 5,483,579 A | 1/1996 | Stogel |
| 5,504,805 A | 4/1996 | Lee |
| 5,509,049 A | 4/1996 | Peterson |
| 5,559,860 A | 9/1996 | Mizikovsky |
| 5,572,576 A | 11/1996 | Klausner et al. |
| 5,583,925 A | 12/1996 | Bernstein |
| 5,588,037 A | 12/1996 | Fuller et al. |
| 5,610,970 A | 3/1997 | Fuller et al. |

(List continued on next page.)

OTHER PUBLICATIONS

Digital Cellular Telecommunications System; Unstructured Supplementary Service Data (USSD)—Stage 2 (Global System for Mobile Communications 03.90) Version 5.0.0; European Telecommunications Standards Institute (ETSI), Dec. 1996, Sophia Antipolis, France.

Accessline's Dumb Subscriber Service, Computer Telephony, Jul. 1, 1995, United States.

AIN–It LetsYou Get Inside The Phone Network, Computer Telephony, Apr. 1, 1996, United States.

Churn Spurners and Money Earners, Accessline Technologies, Computer Telephony, Nov. 1997, United States.

(List continued on next page.)

*Primary Examiner*—Ahmad F. Matar
*Assistant Examiner*—Hector Agdeppa
(74) *Attorney, Agent, or Firm*—Thomas, Kayden, Horstemeyer & Risley, LLP

(57) ABSTRACT

A cellular telephone system is provided with a process and apparatus for screening an incoming call. The process is carried out by, and the apparatus comprises, a service provider (20) and a mobile station (30). The mobile station (30) answers the incoming call and places the call on hold. The mobile station (30) connects to the service provider (20) and places the service provider (20) and the incoming caller on multi-party hold. The mobile station (30) then signals the service provider (20) to begin screening the call. In response, the service provider (20) prompts the incoming caller for the incoming caller's identification and then communicates this information to the mobile station (30). Based on this information, the mobile station (30) can elect to accept or reject the incoming call.

18 Claims, 12 Drawing Sheets

U.S. PATENT DOCUMENTS

| | | | |
|---|---|---|---|
| 5,652,789 A | | 7/1997 | Miner et al. |
| 5,659,597 A | | 8/1997 | Bareis et al. |
| 5,673,299 A | | 9/1997 | Fuller et al. |
| 5,717,740 A | | 2/1998 | Penning et al. |
| 5,758,279 A | | 5/1998 | Foti |
| 5,764,731 A | | 6/1998 | Yablon |
| 5,764,746 A | * | 6/1998 | Reichelt ................ 379/210.01 |
| 5,835,570 A | | 11/1998 | Wattenbarger |
| 5,905,774 A | | 5/1999 | Tatchell et al. |
| 5,946,386 A | * | 8/1999 | Rogers et al. ......... 379/265.09 |
| 5,953,393 A | | 9/1999 | Culbreth et al. |
| 5,960,395 A | | 9/1999 | Tzirkel-Hancock |
| 5,999,611 A | | 12/1999 | Tatchell et al. |
| 6,021,181 A | | 2/2000 | Miner et al. |
| 6,038,443 A | * | 3/2000 | Luneau ....................... 455/415 |
| 6,038,544 A | * | 3/2000 | Machin et al. ................ 705/11 |
| 6,047,053 A | | 4/2000 | Miner et al. |
| 6,049,718 A | * | 4/2000 | Stewart ................... 455/456.4 |
| 6,154,531 A | * | 11/2000 | Clapper ................ 379/142.14 |
| 6,160,877 A | | 12/2000 | Tatchell et al. |
| 6,173,048 B1 | * | 1/2001 | Malik ................... 379/207.11 |
| 6,185,285 B1 | * | 2/2001 | Relyea et al. .......... 379/204.01 |
| 6,373,925 B1 | * | 4/2002 | Guercio et al. ................ 379/82 |

OTHER PUBLICATIONS

Ellen Muraskin, Speech Rec Ready, Computer Telephony, vol. 6, Issue 6, Jun. 1, 1998, United States.

Thomas K. Crowe, Esq., Payphone Payback, Computer Telephony, Aug. 1, 1998, United States.

Dan O'Shea, Programmable Switching: The Flexible Foundation, Telephony, vol. 230, Issue 26, Mar. 4, 1996, p. 22, Chicago, Illinois.

Jason Meyers, Wireless Eyes Are On Differentiation, Telephony, vol. 230, Issue 26, Jun. 24, 1996, p. 30, Chicago, Illinois.

Jason Meyers, Giving Wireless An Edge, Telephony, vol. 231, Issue 4, Jul. 22, 1996, p. 64, Chicago, Illinois.

Jason Meyers, Personal Numbers Get A Plug, Telephony, vol. 232, Issue 9, Mar. 3, 1997, p. 8, Chicago, Illinois.

Dan O'Shea, The Talk Of The Industry . . . Again, Telephony, vol. 232, Issue 11, Mar. 17, 1997, p. 99, Chicago, Illinois.

PCT/US98/22736 International Search Report, Mar. 12, 1999.

PCT/US98/22714 International Search Report, Apr. 14, 1999.

* cited by examiner

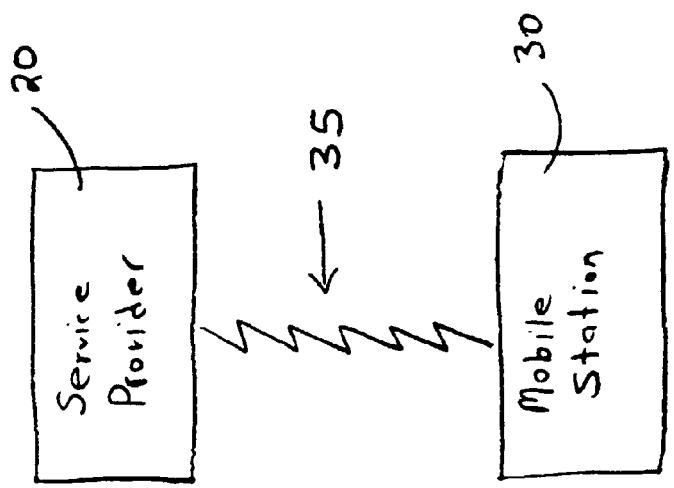

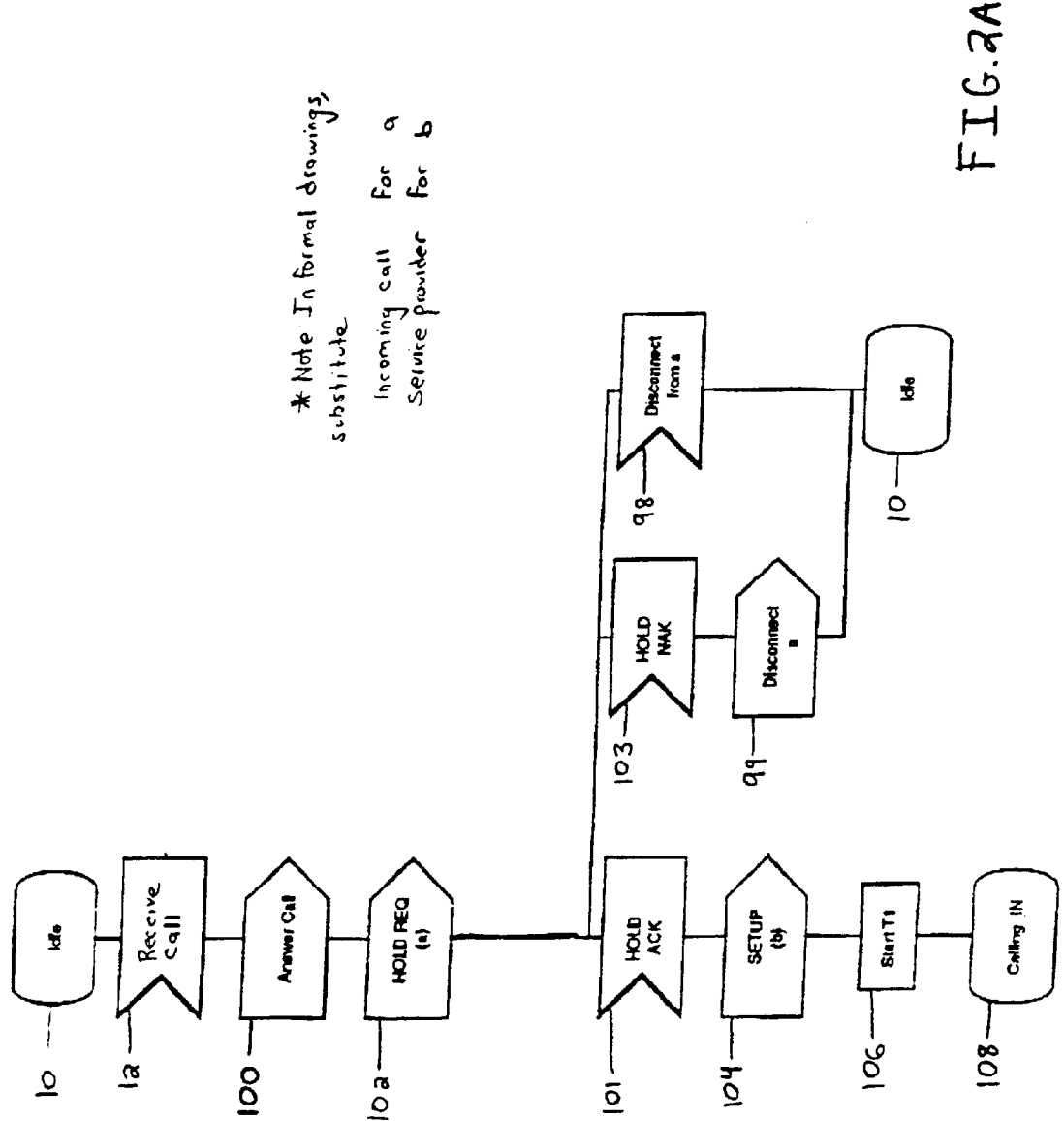

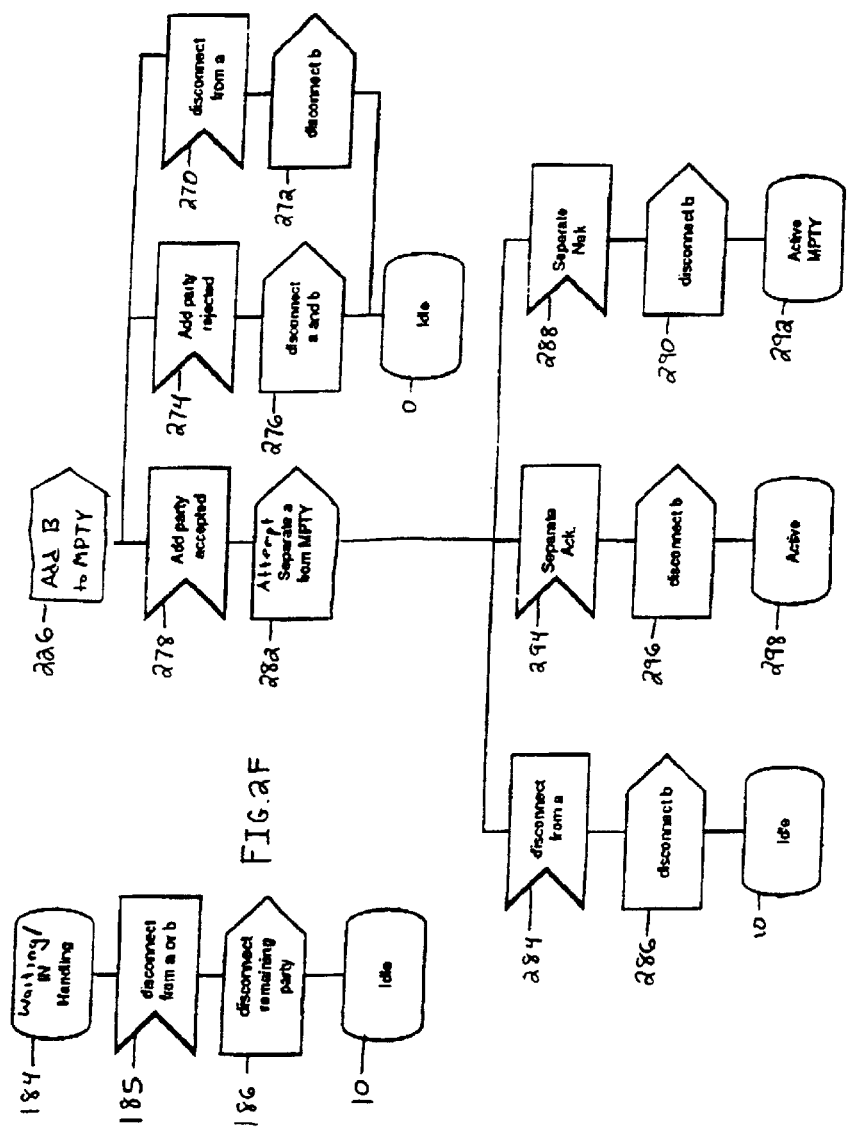

CALL SCREENING METHOD AND APPARATUS

CROSS-REFERENCE TO RELATED APPLICATION

A This application is the National Stage of International Application No. PCT/US98/22736, filed Oct. 27, 1998, which claims the benefit under 35 U.S.C. §119(e) of U.S. Provisional Application No. 60/064,201, filed Nov. 4, 1997.

FIELD OF THE INVENTION

This invention relates to systems and methods for screening incoming calls to a mobile station, or a handset, in a cellular telephone system. Particularly, this invention relates to systems and methods for screening incoming calls to a cellular-telephone mobile station in which the mobile station performs the control function in the system or method.

INCORPORATION BY REFERENCE

The subject matter disclosed and claimed in the copending application entitled "Outgoing Call Handling System and Method." invented by the same inventors, filed on the same day as the instant application, and to be assigned to the same assignee, is hereby incorporated by reference.

BACKGROUND OF THE INVENTION

The screening of incoming calls is important to cellular telephone users because many cellular-telephone subscriber plans provide for billing subscribers for incoming-answered, as well as outgoing, calls. The subscriber who knows the identity of the incoming caller can choose to answer only those incoming calls for which the subscriber wishes to pay. Moreover, the subscriber who knows the identity of the incoming caller can choose to answer the call or allow the incoming caller to leave a voice message depending upon the subscriber's priorities, time constraints, and other considerations.

There are several methods and products that allow the user of a telephone to screen incoming calls. U.S. Pat. No. 5,473,671 to Partridge cites some of them and explains their disadvantages, and its disclosure is incorporated by reference. Answering machines are probably the most popular method of call screening in use today. One of the disadvantages of the answering machine method is that a connection is made between the incoming caller and the answering machine even if the incoming call is unwanted. In a cellular system, the user of an answering machine might pay for the time the incoming caller takes to leave a message. The "Caller ID" feature is also a popular method of call screening. Among the disadvantages of the "Caller ID" feature is that some systems provide for identifying only the telephone number from which the incoming call originates. Also, state of the art cellular systems do not provide the "Caller ID" feature.

U.S. Pat. No. 5,473,671 to Partridge discloses an invention for selectively screening incoming calls for cellular telephone systems. The invention disclosed therein maintains a preselected list of caller identities, such as telephone numbers. The user predesignates treatment for each identity, such as forward to the user's cellular telephone, offer the caller the option of paying for the call, or other treatment. An incoming call is compared to the preselected list and is treated in the manner predesignated. One of the disadvantages of this invention is that it requires predesignation of treatment. It does not allow the user to make dynamic decisions regarding how to treat the incoming call based upon the user's needs and desires at the time of the incoming call.

U.S. Pat. No. 5,559,860 to Mizikovsky discloses an invention for screening incoming calls at a mobile station. In a manner similar to the invention disclosed in U.S. Pat. No. 5,473,671, the invention disclosed therein compares the incoming call to a preselected list containing calling party identification data and corresponding predesignated response categories. The invention responds to the incoming call in the manner indicated by the preselected list. This invention has the same disadvantages as those of the invention disclosed in U.S. Pat. No. 5,473,671. In particular, dynamic decisions by the user are not permitted.

SUMMARY OF THE INVENTION

The present invention provides processes and apparatus for screening an incoming call from an incoming call in a cellular telecommunications system. The processes are carried out by, and the apparatus comprises, a service provider and a mobile station. The mobile station answers the incoming call and places the call on hold. The mobile station connects to the service provider and places the service provider and the incoming caller on multi-party hold. The mobile station then signals the service provider to begin screening the call. In response, the service provider prompts the incoming caller for the incoming caller's identification and then communicates this information to the mobile station. Based on this information, the mobile station can elect to accept or reject the incoming call.

It is therefore an object of the present invention to provide a process and product to screen incoming telephone calls. It is a further object of the present invention to provide for the dynamic screening of incoming telephone calls. It is a still further object of the present invention to provide for screening of incoming calls that lessens the amount of time spent by a cellular-telephone-service subscriber answering unwanted calls and expending money paying for those calls. It is a still further object of the present invention to provide a process and product to screen incoming telephone calls in which the mobile station controls the operation.

BRIEF DESCRIPTION OF THE DRAWINGS

FIG. 1 is a block diagram of a product in accordance with the present invention.

FIG. 2A is a flow chart illustrating a first portion of an embodiment of the claimed process, showing particularly the action of a mobile station.

FIG. 2F is a flow chart illustrating a sixth portion of an embodiment of the claimed process, showing particularly the action of a mobile station.

FIG. 2G is a flow chart illustrating a seventh portion of an embodiment of the claimed process, showing particularly the action of a mobile station.

DETAILED DESCRIPTION OF THE PREFERRED EMBODIMENT

Figure 2B:
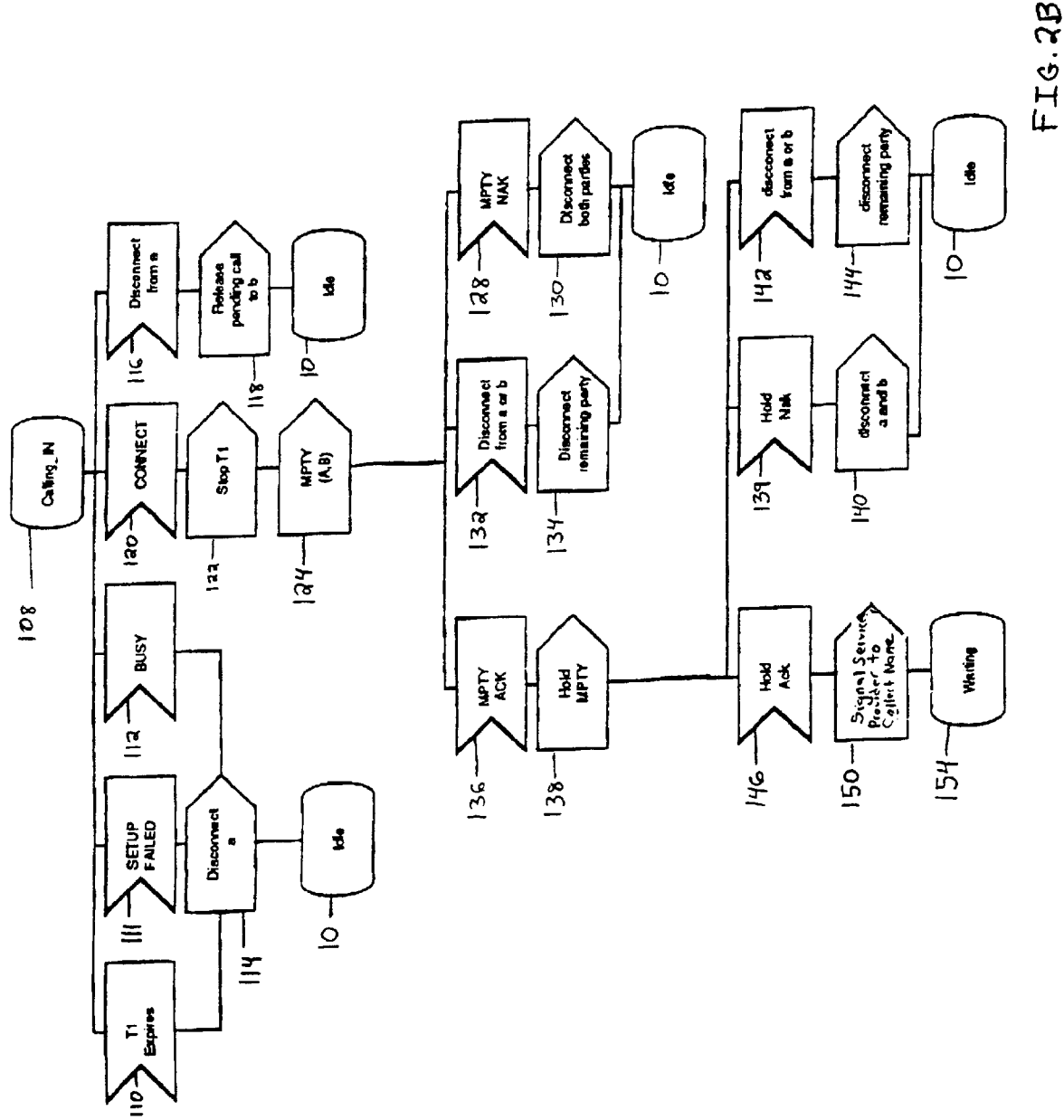
FIG. 2B is a flow chart illustrating a second portion of an embodiment of the claimed process, showing particularly the action of a mobile station.

One embodiment of the present invention includes a process for screening an incoming call from an incoming caller wherein the apparatus for carrying out the process comprises a mobile station and a service provider, said process comprising the following steps: a) sending communication from an incoming caller to the service provider regarding the incoming caller; b) sending communication from the service provider to the mobile station regarding the incoming caller; c) selecting one of a set comprising (1) accepting the incoming call and (2) rejecting the incoming call.

Another embodiment of the present invention includes a process for screening an incoming call from an incoming caller wherein the apparatus for carrying out the process comprises a mobile station, said process comprising the following steps: a) answering an incoming call from an incoming caller; b) placing said incoming caller on hold; c) communicating with a service provider; d) placing the service provider and the incoming caller on multi-party hold; and e) signalling the service provider to begin screening.

Another embodiment further comprises the following step: f) receiving communication from the service provider indicating information received from the incoming caller.

Another embodiment further comprises the following step: g) selecting one of a set comprising (1) accepting the call and (2) rejecting the call.

Another embodiment further comprises the following steps: h) in the event that accepting the call was selected in step g), disconnecting communication with the service provider; and i) in the event that rejecting the call was selected in step g), signalling the service provider that the service provider should handle the incoming call.

Another embodiment of the present invention includes a process for screening an incoming call from an incoming caller wherein the apparatus for carrying out the process comprises a service provider, said process comprising the following steps: a) receiving communication from a mobile station indicating a desire to connect; b) connecting with the mobile station; c) receiving communication from the mobile station to begin screening an incoming call from an incoming caller; d) collecting information regarding the incoming caller; and e) communicating information collected in step d) to the mobile station.

Another embodiment further comprises the following step: f) receiving communication from the mobile station indicating further action desired by a user of the mobile station.

Another embodiment further comprises the following step: g) communicating the further action desired by the mobile station's user to the mobile station.

Another embodiment includes the following step: h) in the event that the communication received in step f) indicates a desire to accept the call, disconnecting communication with the mobile station.

Another embodiment comprises the following step: i) in the event that the communication received in step f) indicates a desire to reject the call, prompting the incoming caller for information.

Another embodiment comprises the following step: j) disconnecting communication with the mobile station.

Another embodiment of the present invention includes a process for screening an incoming call from an incoming caller wherein the apparatus for carrying out the process comprises a mobile station and a service provider, said process comprising the following steps: a) answering an incoming call from an incoming caller; b) placing said incoming caller on hold; c) sending communication from the mobile station to a service provider indicating a desire to connect; d) receiving communication to the service provider from the mobile station indicating a desire to connect; e) connecting the mobile station and the service provider; f) placing the service provider and the incoming caller on multi-party hold; g) sending communication to the service provider from the mobile station signalling the service provider to begin screening; h) receiving communication from the mobile station to the service provider signalling the service provider to begin screening; i) collecting information from the incoming caller; j) sending communication regarding information collected in step i) from the service provider to the mobile station; k) receiving communication from the service provider to the mobile station regarding information collected in step i); l) selecting one of a set comprising (1) accepting the call and (2) rejecting the call; m) in the event that accepting the call was selected in step l), disconnecting the connection between the service provider and the mobile station; and n) in the event that rejecting the call was selected in step l), signalling the service provider that the service provider should handle the incoming call.

Another embodiment of the present invention includes an apparatus for screening an incoming call for use in cellular telecommunications, said apparatus comprising: a service provider; and a mobile station; wherein said service provider is programmed to collect information regarding an incoming caller's identification and to communicate at least part of said information to said mobile station; and wherein said mobile station is programmed to receive communications from said service provider regarding said information and to communicate said information to a user of said mobile station, whereby said user can select one of a set comprising (1) accepting the incoming call and (2) rejecting the incoming call.

FIG. 1 shows a block diagram of an embodiment of the present invention. The apparatus shown in FIG. 1 includes a service provider 20, or a service node. The apparatus also includes a mobile station 30, or handset. The service provider 20 and the mobile station 30 are in communication 35. The attributes and operation of a service provider and a mobile station are well known to those of ordinary skill in the art of the present invention. The service provider 20 and mobile station 30 shown in FIG. 1 have all of the standard attributes of service providers and mobile stations known in the art today. The operation of the apparatus shown in FIG. 1 is best described by reference to the process which the apparatus carries out. The process is described below.

FIGS. 2A–2G are linked flowcharts showing an embodiment of the present invention in detail. The flowcharts in FIGS. 2A–2G describe the operation of the mobile station, or handset, during the carrying out of an embodiment of the present invention. The mobile station and the service provider take the steps shown in FIGS. 2A–2G, 3A–3B, and 4A–4D in cooperation with each other to carry out the preferred embodiment of the present invention. The embodiment shown therein is described below.

In the process shown, the mobile station starts at idle 10. An incoming caller calls the mobile station and the mobile station receives the call 12. The mobile station carries out the step of answering the incoming call. As shown in FIG. 2A. the mobile station answers the call 100 from the incoming caller. This answering 100 occurs without alerting the mobile-station user. For example, this answering 100 occurs without the mobile station ringing. The mobile station user can elect to be alerted when this answering 100 occurs, however.

The mobile station then carries out the step of placing the incoming caller on hold. As shown in FIG. 2A, the mobile station attempts to place the incoming caller on hold 102. If the attempt 102 is not acknowledged by the incoming caller 103, the caller is disconnected 99, the process ceases and the mobile station returns to idle 10. Likewise, if the incoming call is disconnected 98, the process ceases and the mobile station returns to idle 10.

If the hold is acknowledged 101, and is thus successful, the mobile station carries out the step of communicating with a service provider or service node. As shown in FIG. 2A, the mobile station begins calling the service provider or service node or platform 104. Immediately after beginning the call to the service provider 104, the mobile station starts a timer 106, designated herein as T1. The starting of a timer 106 does not interrupt the call to the service provider, and the call continues 108. The timer T1 governs the amount of time the mobile station will wait for the service platform to connect. The timer expires preferably in a very short amount of time, between approximately five and six seconds.

As shown in FIG. 2B, if the service provider does not answer after a predesignated time after the starting of timer T1 110, or if the call fails 111, or the service provider is busy 112, the caller is disconnected 114, and the mobile station returns to idle mode 10. If the call from the incoming caller is disconnected in a manner not specifically provided for 116, e.g., the caller hangs up, the pending call to the service provider is released 118, and the mobile station returns to idle mode 10.

If the service provider answers the mobile station's call and connects 120, the timer, T1, is stopped 122. Then, the mobile station carries out the step of placing the service provider and the incoming caller on multi-party hold. As shown in FIG. 2A, the mobile station begins putting the caller and the service provider in multi-part 124, i.e., attempts to bridge the caller and the service provider. If the multi-party is not acknowledged 128, the mobile station will disconnect both the caller and the service provider 130 and return to idle 10. If either the incoming caller or the service provider disconnects from the connection with the mobile station 132, the mobile station will disconnect the remaining connection 134, and will return to idle 10. If the multi-party is acknowledged 136, and is thus successful, the handset begins placing the connection between the three parties on multi-party hold 138. If the multi-party hold is not acknowledged 139, the mobile station disconnects both the incoming caller and the service provider 140 and returns to idle mode 10. If either the incoming caller or the service provider disconnects from the multi-party 142, the mobile station disconnects the remaining connected-party 144 and returns to idle 10. If the hold is acknowledged 146, and is thus successful, the parties are in multi-party hold.

Once the parties are in multi-party hold 146, the mobile station carries out the step of signalling the service provider to begin screening. As shown in FIG. 2B, the mobile station signals the service provider to begin screening 150 and awaits the service provider's response 154. The mobile station preferably makes this communication using Unstructured Supplementary Service Data (USSD). Once this signal is received, the service provider carries out the step of collecting information from the incoming caller. The service provider prompts the incoming caller for the caller's name and awaits the caller's response. For example, the service provider plays the following message to the incoming caller: "Please state your name" and then records the caller's response. The service provider's action in this regard is described in further detail below and in FIGS. 4A–4D.

Figure 2C:
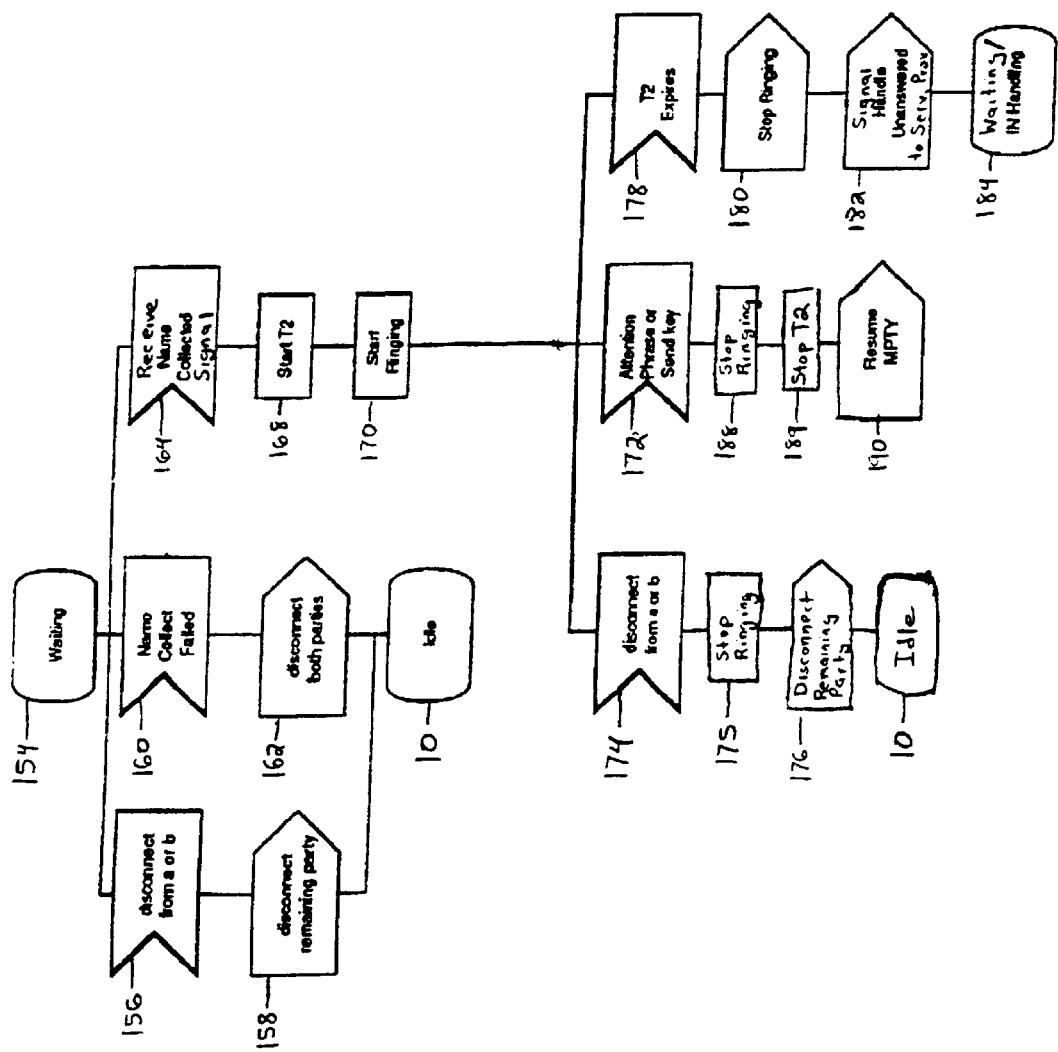
FIG. 2C is a flow chart illustrating a third portion of an embodiment of the claimed process, showing particularly the action of a mobile station.

As shown in FIG. 2C, if either the incoming caller or the service provider disconnects from the connection with the mobile station 156 while the service provider is awaiting the caller's response 154, the mobile station disconnects the remaining connection 158 and return to idle mode 10. If the service provider receives no response from the incoming caller or the name-collect fails for some other reason and the service provider communicates that the name-collect failed to the mobile station 160, the mobile station disconnects both the incoming caller and the service provider 162 and returns to idle mode 10. The communication of name collect failure is preferably completed using USSD. If the incoming caller's response is successfully collected by the service provider, the mobile station will receive a signal that the name was collected from the service provider 164. The service provider preferably makes this communication using USSD.

As shown in FIG. 2C, once the mobile station receives the successful name-collection signal 164, the mobile station starts a timer 168, designated T2. Then, the mobile station will begin ringing 170. The mobile station will continue ringing until either the service provider or the calling party disconnects 174, the timer T2 reaches a predesignated expiration time 178, or the mobile station is answered 172. The timer T2 governs the amount of time the process waits for the mobile station user to answer.

Once the mobile station begins ringing, as shown in FIG. 2C, if the either the service provider or the calling party disconnects 174, then the mobile station stops ringing 175, disconnects the remaining party 176, and enters idle mode 10. The timer T2 is preset to expire after a designated amount of time, preferably thirty and forty-five seconds. If the timer reaches the designated amount of time and expires 178, the mobile station stops ringing 180 and signals the service provider to handle the call 182. This signal preferably occurs using USSD. Then, the service provider handles the call while the mobile station waits 184. This handling is discussed in further detail below. For example, the service provider records a message on voice mail. As seen in FIG. 2F, once the service provider performs its handling of the call while the mobile station waits 184, the mobile station is disconnected from the service provider 185. Afterwards, the mobile station disconnects the incoming caller 186 and returns to idle mode 10.

Figure 2D:
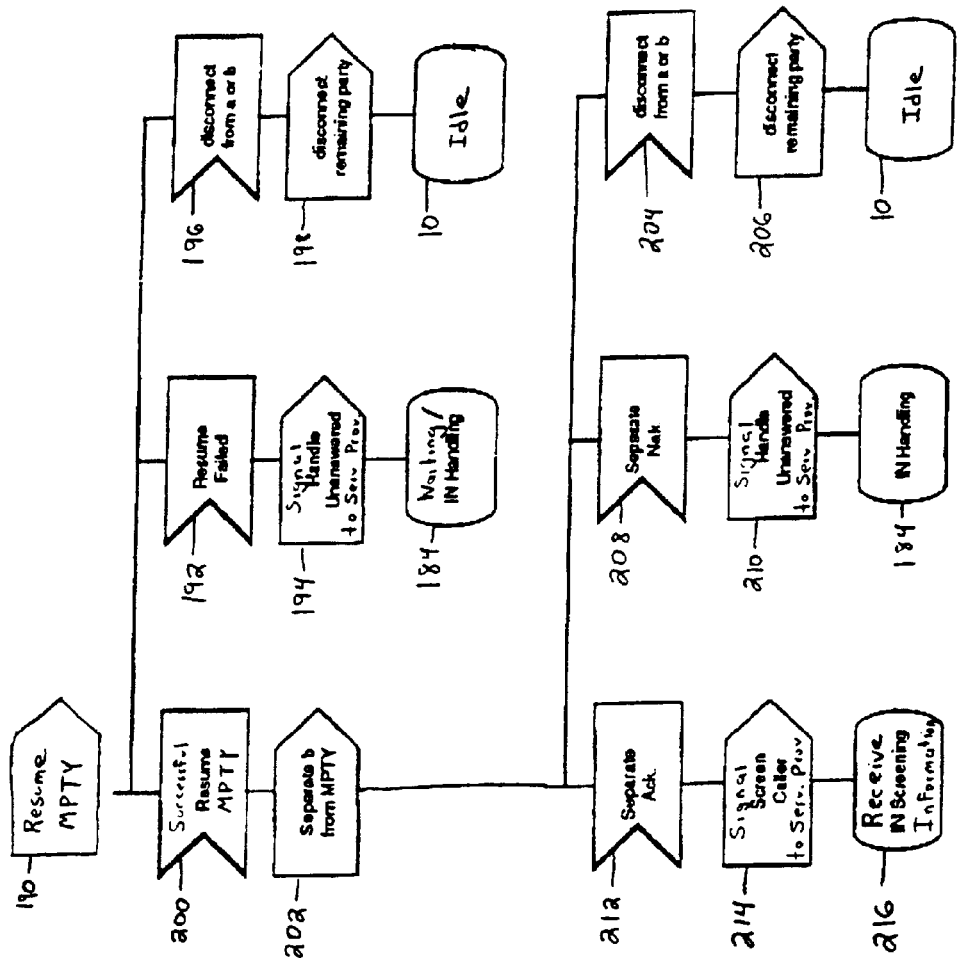
FIG. 2D is a flow chart illustrating a fourth portion of an embodiment of the claimed process, showing particularly the action of a mobile station.

The mobile station preferably is programmed to recognize voice signals. Referencing FIG. 2C, if the mobile station answers the call 172, preferably by the user of the mobile station speaking an "attention phrase" such as "Answer," "Attention," or "PowerCall," the mobile station stops ringing 188 and stops the timer T2 189. The mobile station, service provider, and incoming caller attempt to resume multi-party connection 190. As seen in FIG. 2D, if the attempt to enter multi-party connection fails 192, the mobile station signals the service provider to handle the call 194. This signalling preferably is accomplished using USSD. Following this signalling 194, as seen in FIG. 2F, the mobile station awaits the call handling 184. Once the service provider handles the call by recording a message or other service, the connection between the service provider and the mobile station is broken 185, the connection between the mobile station and the incoming caller is disconnected 186, and the mobile station returns to idle mode 10. Referencing FIG. 2D, if the mobile station's connection with either the service provider or the incoming caller is broken 196 while attempting to resume multi-party 190, the mobile station will disconnect from the remaining party 198, and return to idle mode 10.

If the multi-party resumes successfully 200, the mobile station attempts to separate the connection with the service provider from the multi-party 202. If, during this attempt, either the service provider or the incoming caller is disconnected from the mobile station 204, the mobile station disconnects the remaining party 206 and returns to idle mode 10. If the separation attempt is not acknowledged by the service provider 208, the mobile station signals the service provider to handle the call 210. This signalling is preferably accomplished with USSD. Then, the service provider handles the call as the mobile station waits 184. Referring to FIG. 2F, after the service provider handles the incoming call, the service provider is disconnected 185, the incoming caller is disconnected 186, and the mobile station returns to idle mode 10.

Figure 4A:
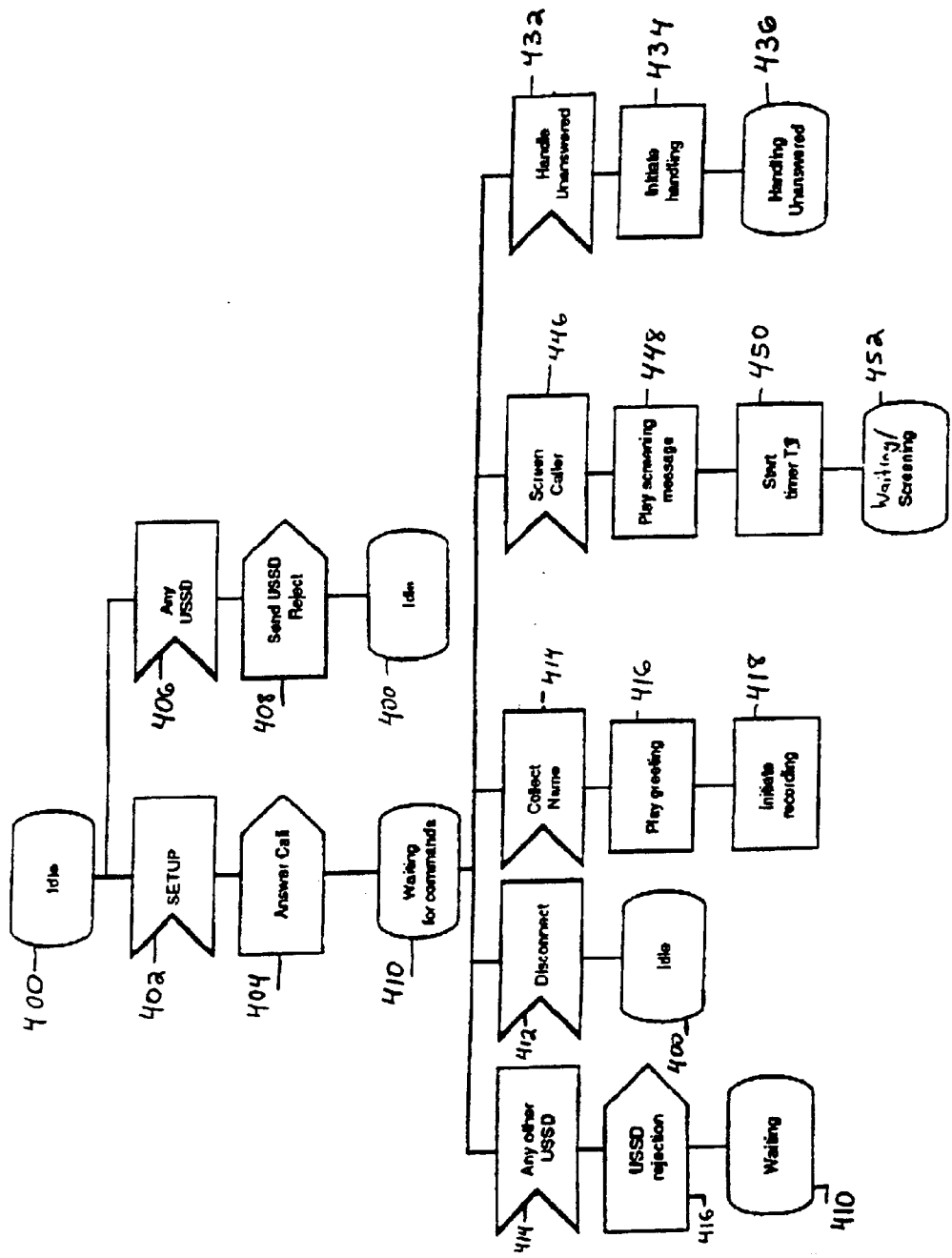
FIG. 4A is a flow chart illustrating a first portion of an embodiment of the claimed process, showing particularly the action of a service provider.
Figure 4B:
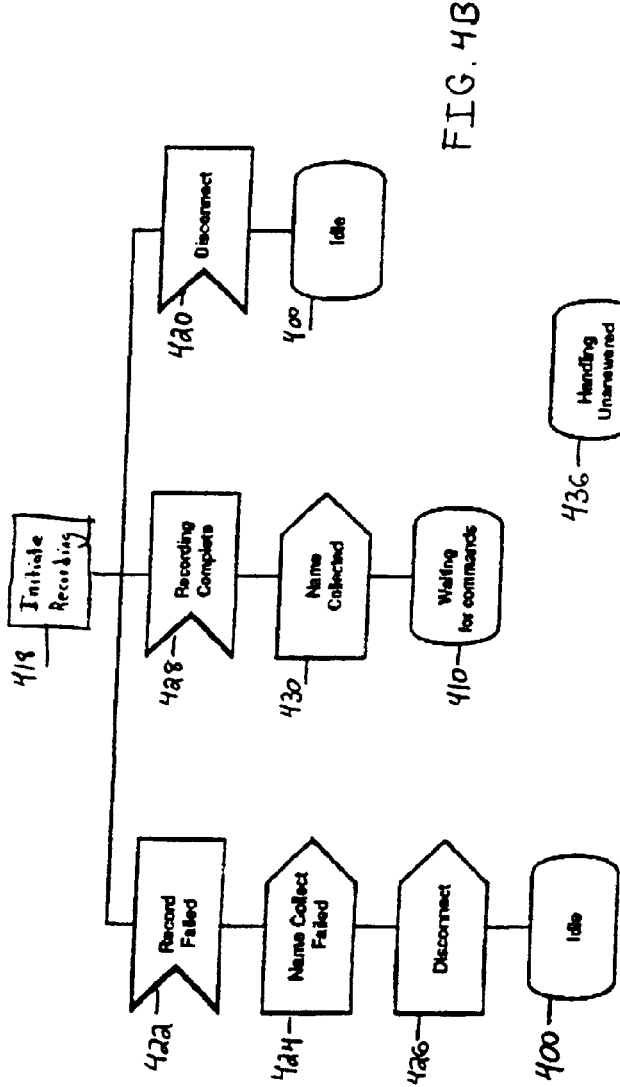
FIG. 4B is a flow chart illustrating a second portion of an embodiment of the claimed process, showing particularly the action of a service provider.
Figure 4C:
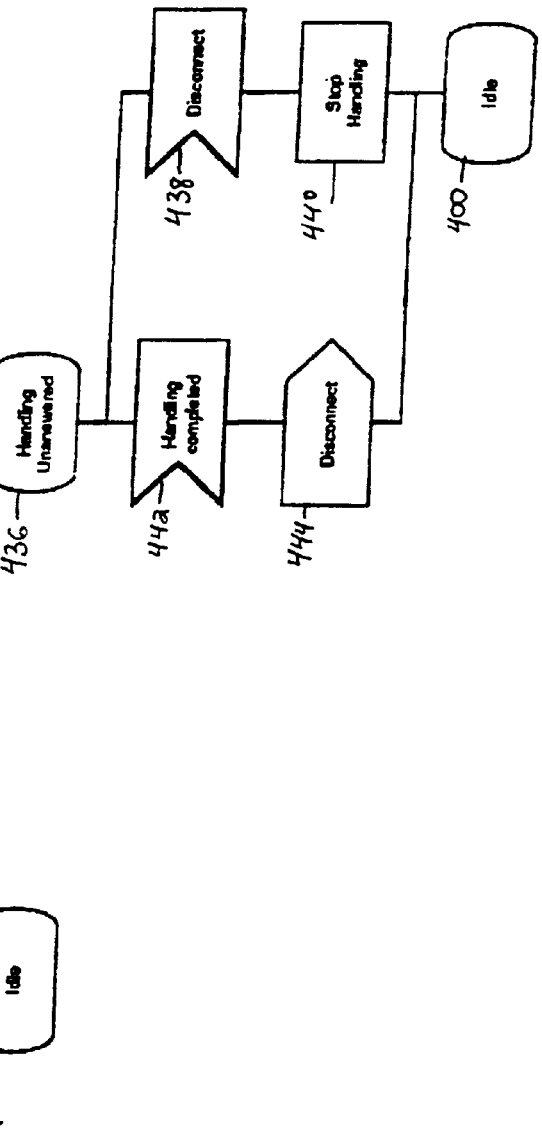
FIG. 4C is a flow chart illustrating a third portion of an embodiment of the claimed process, showing particularly the action of a service provider.
Figure 4D:
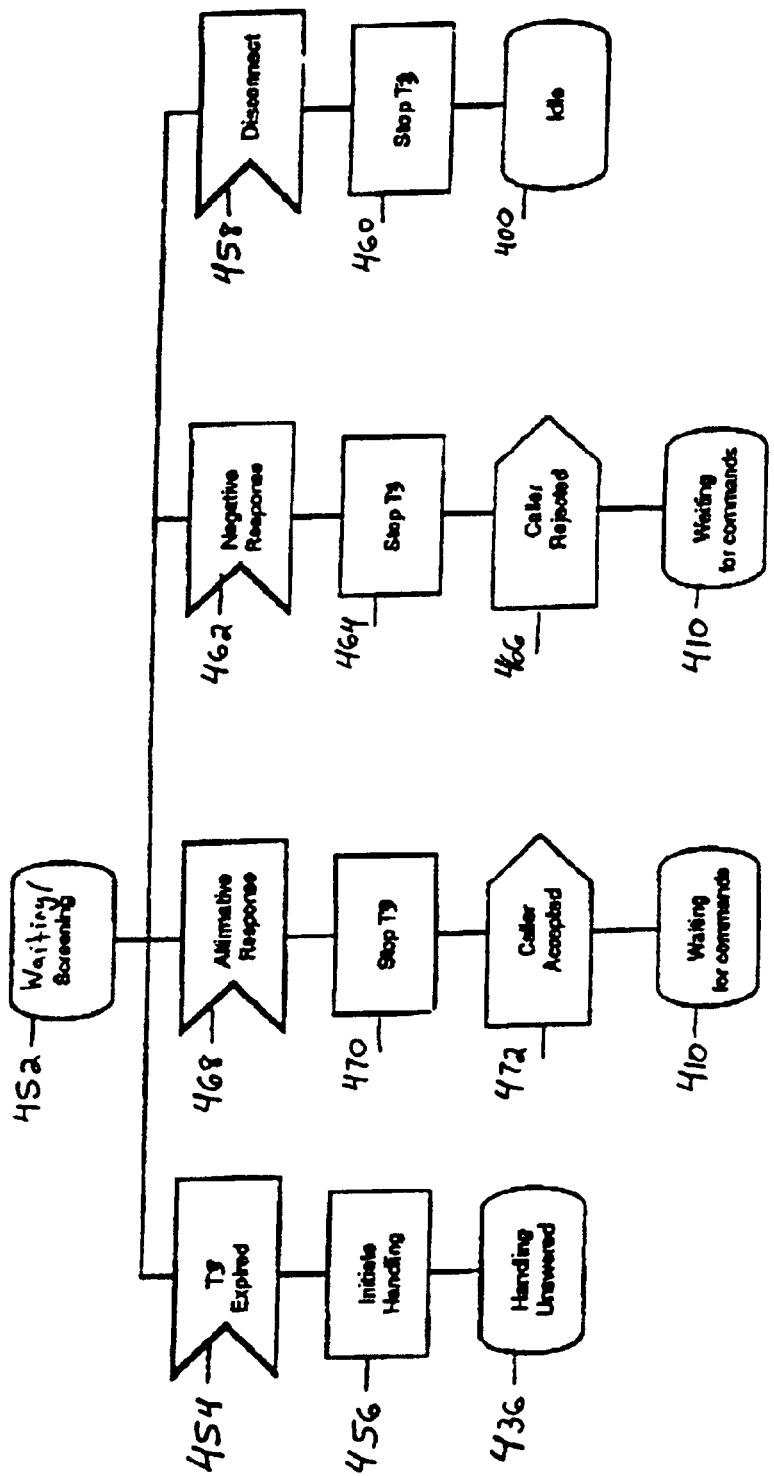
FIG. 4D is a flow chart illustrating a fourth portion of an embodiment of the claimed process, showing particularly the action of a service provider.

If the separation attempt is acknowledged 212, and is thus successful, the mobile station signals the service provider to proceed with screening 214. This signalling is preferably accomplished using USSD. The service provider's screening is described in further detail below and is shown in FIGS. 4A and 4D.

Figure 2E:
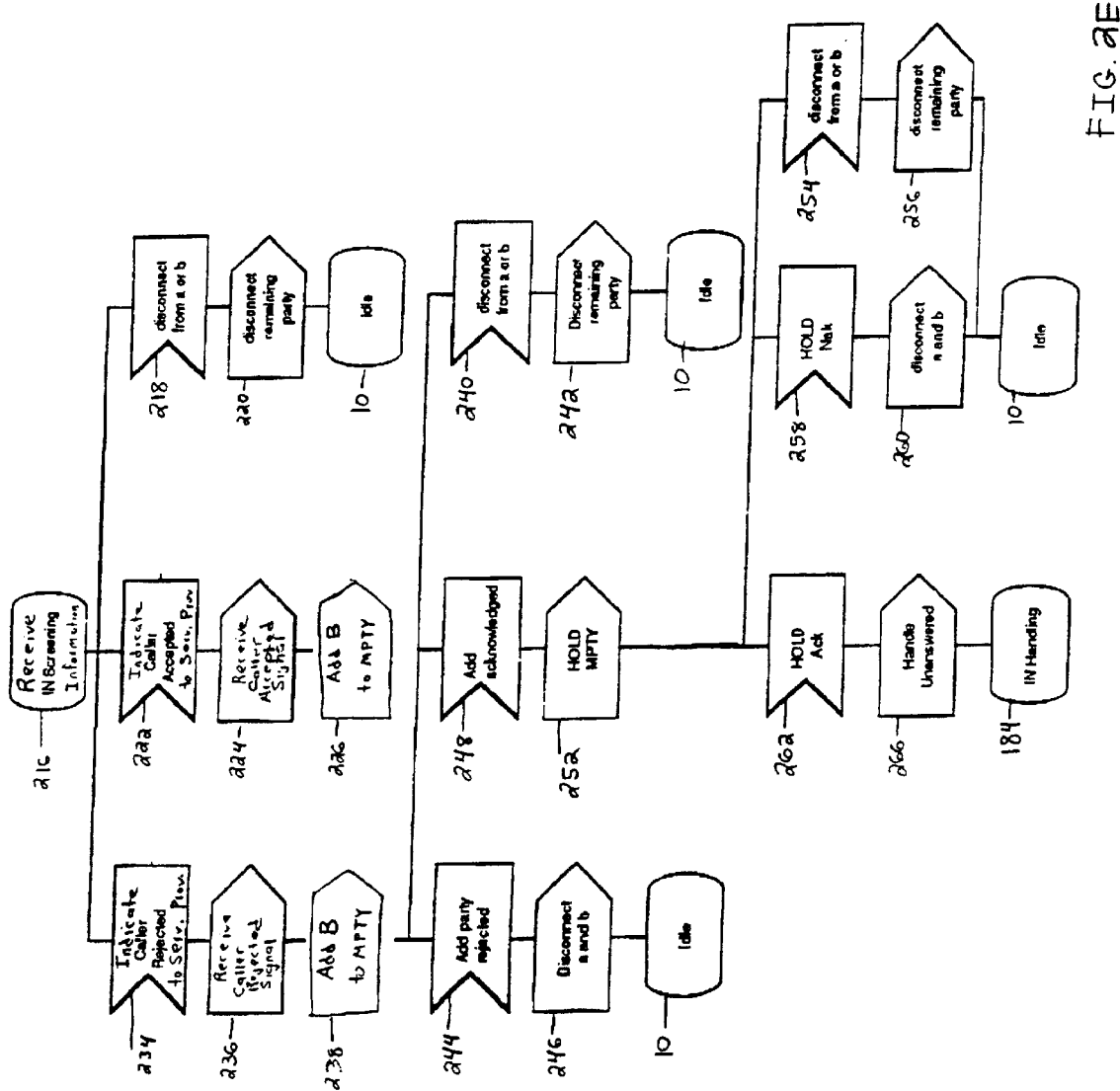
FIG. 2E is a flow chart illustrating a fifth portion of an embodiment of the claimed process, showing particularly the action of a mobile station.

Next, the mobile station carries out the step of receiving communication from the service provider indicating the information collected from the caller. Referring to FIG. 2D and FIG. 2E, the service provider communicates and the mobile station receives the information provided by caller 216. For example, the service provider plays and the mobile station receives the following message: "Hello, [information provided by the caller] is holding. Would you like to accept the call?" Then, the user of the mobile station, whether by action or inaction, carries out the step of selecting to either accept the call or reject the call. Referring to FIG. 2E, if the service provider or incoming caller is disconnected while the decision to accept or reject the call is being made 218, the mobile station disconnects the remaining party 220 and returns to idle mode 10. Referencing FIG. 2E, if the user chooses to accept the call, the user accepts the call by saying "Yes" or by some other indication of acceptance, and this choice is communicated to the service provider by the mobile station 222. If the user accepts the call 222, the service provider communicates this acceptance to the mobile station and the mobile station receives such communication 224. This signalling is preferably accomplished using USSD. The service provider's steps in screening and communicating during this step is described further below and in FIGS. 4C and 4D.

Next, the mobile station attempts to place the service provider in multi-party connection 226. Referring to FIG. 2G, if the incoming caller is disconnected during the attempt 270, the mobile station will disconnect the service provider 272 and return to idle mode 10. If the attempt to place the service provider in multi-party connection is rejected 274, the mobile station disconnects the service provider and the incoming caller 276 and returns to idle mode 10. If the attempt to place the service provider in multi-party connection is accepted 278 and is thus successful, the mobile station places the service provider in the multi-party connection and then attempts to separate the incoming caller from the multi-party connection 282.

If, during the attempt to separate the incoming caller from multi-party 282, the mobile station is disconnected from the incoming caller 284, the mobile station will disconnect the service provider 286 and return to idle mode 10. If the attempt to separate the incoming caller is not acknowledged 288, the mobile station will disconnect the service provider 290 and will be in Active Multi-Party state with the incoming caller 292. Once the mobile station is in a Active Multi-Party state with the incoming caller, the call and connection is no longer proceeding through the process described herein, and the call is being handled as a normal GSM call. If the attempt to separate 282 is acknowledged 294, the mobile station disconnects the service provider 296, and will be in Active state with the incoming caller 298. As above, once the mobile station is in a Active state with the incoming caller, the call and connection is no longer proceeding through the process described herein, and the call is being handled as a normal GSM call.

Referring to FIG. 2E, if the user chooses to reject the call, the user rejects the call by saying "No" or by some other indication of rejection, and this choice is communicated to the service provider 234. If the user rejects the call, the service provider signals the mobile station that the caller was rejected and the mobile station receives this communication 236. This signal is preferably carried out using USSD. The service provider's steps in carrying out this screening is described further below and in FIGS. 4C and 4D. Once the mobile station receives the signal, the mobile station attempts to put the service provider in the multi-party connection 238. If the connection between the mobile station and the service provider or the incoming caller is disconnected 240, the mobile station disconnects the remaining party 242 and returns to idle mode 10. If the attempt to put the service provider in the multi-party connection is rejected 244, the mobile station disconnects both the service provider and the incoming caller 246 and returns to idle mode 10.

If the attempt to put the service provider in the multi-party connection is acknowledged 248, and is thus successful, the mobile station puts the service provider in the multi-party connection. Next, the mobile station attempts to place the multi-party connection on hold 252. If either the service provider or the incoming caller is disconnected 254, the mobile station disconnects the remaining party 256 and returns to idle mode 10. If the hold attempt is not acknowledged 258, the mobile station disconnects the service provider and the incoming caller 260 and returns to idle mode 10. If the hold attempt is acknowledged 262, and is thus successful, the mobile station puts the multi-party on hold. Next, the mobile station signals the service provider that the service provider should handle the call 266. This signalling is preferably accomplished using USSD. Then, the service provider performs call handling as the mobile station waits 184. For example, the service provider records a voice-mail message. Referring to FIG. 2F, after the service provider performs its handling, the service provider is disconnected from the connection 185 and the mobile station disconnects the caller 186 and returns to idle mode 10.

Figure 3A:
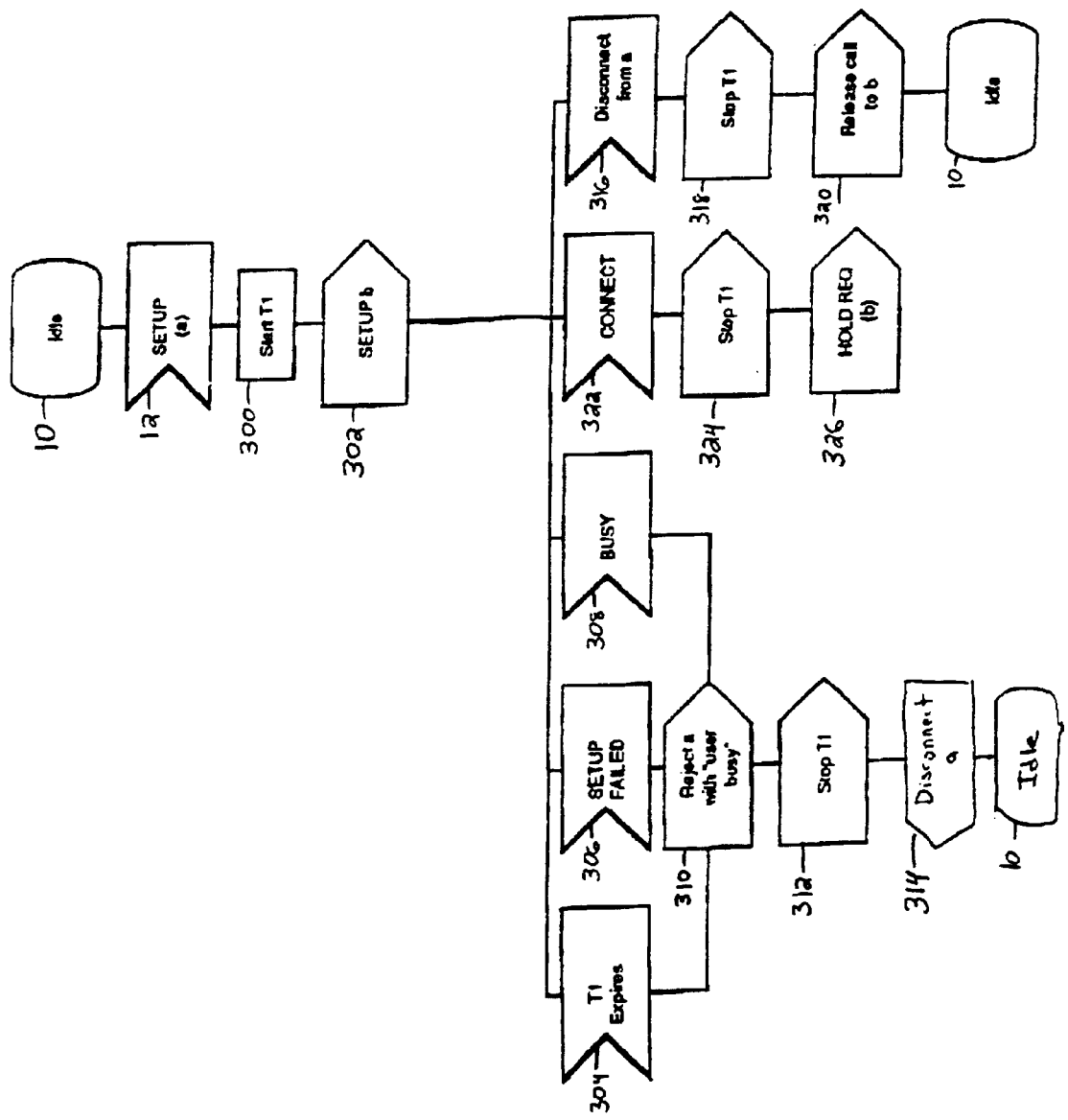
FIG. 3A is a flow chart illustrating a first portion of another embodiment of the claimed process, showing particularly the action of a mobile station.
Figure 3B:
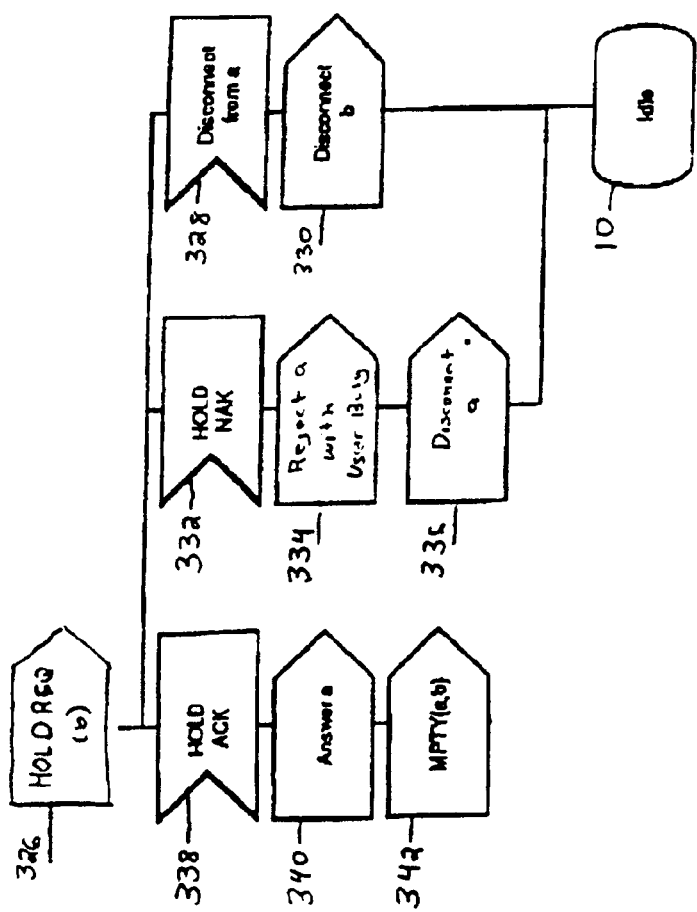
FIG. 3B is a flow chart illustrating a second portion of another embodiment of the claimed process, showing particularly the action of a mobile station.

FIGS. 3A and 3B are flowcharts serving to describe part of an alternative embodiment of the present invention. The steps shown in FIGS. 3A and 3B substitute for steps 100–122 in the embodiment described above and in FIGS. 2A–2G. Otherwise, the embodiment described in FIGS. 3A and 3B and below is the same as the embodiment described in FIGS. 2A–2G and described above. While the embodiment described above in FIGS. 2A–2G offers many advantages and addresses a need in the art of the present invention, the embodiment has two attributes that some may wish to avoid. In the embodiment described above, the mobile station answers the incoming call very early in the process. Typically, the billing for the incoming caller begins upon the mobile station's answering the call. In the above-described embodiment, if the service provider cannot accept the call, the incoming caller is disconnected. Thus, the incoming caller is billed for the call but was never connected to the service provider and thus never proceeded through call screening. Moreover, in the embodiment described above and in FIGS. 2A–2G, the delay between the incoming caller's call and the caller's connection to the service provider could be long enough for the caller to notice the delay, conclude that the call did not go through, and disconnect. Thus, such delay should be avoided if possible. The alternative embodiment described below and shown in FIGS. 3A and 3B seeks to alleviate these two attributes of the above-described embodiment.

In the process shown in FIGS. 3A and 3B, the mobile station is idle 10. An incoming caller calls the mobile station 12. In the embodiment shown in FIG. 2A, the mobile station then answers the call 100 from the incoming caller. In the present embodiment, shown in FIG. 3A, after the incoming call is detected, the mobile station starts a timer, designated T1 300.

Referring to FIG. 3A, the mobile station next calls a service provider 302. The timer T1 is used to govern the amount of time that the mobile station will wait for the service platform to answer the mobile station's call. If T1 reaches a predesignated time or expires 304, the mobile station's call to the service provider fails 306, or the service provider is busy 308, the mobile station rejects the incoming caller with a busy signal or another "user busy" indicator 310, stops the timer T1 312, disconnects the incoming caller 314, and returns to idle mode 10. If the incoming caller is disconnected from the mobile station 316, the mobile station stops the timer T1 318, releases the call to the service provider 320, and returns to idle mode 10.

If the mobile station's call to the service provider connects 322, the mobile station stops the timer T1 324. Then, the mobile station attempts to place the service provider on hold 326. Referring to FIG. 3B, if the incoming caller is disconnected 328, the mobile station disconnects the service provider 330 and returns to idle mode 10. If the hold attempt is not acknowledged 332, the mobile station rejects the caller with a busy signal or other "user busy" signal 334, disconnects the caller 336, and returns to idle mode 10.

If the hold is acknowledged 338, the mobile station next answers the incoming call 340. The mobile station then attempts to put both the service provider and the incoming caller in a multi-party connection 342. From this point forward, the embodiment shown in FIGS. 3A and 3B proceeds as the embodiment described above and described in FIGS. 2A–2G proceeds from attempting to place the calls in multi-party 124 in FIG. 2B. After beginning to put both the service provider and the incoming caller in a multi-party connection 342 (FIG. 3B), the mobile station waits to see if, referring to FIG. 2B, the multi-party connection is acknowledged 136, not acknowledged 128, or if the service provider or incoming caller disconnects 132. The steps of the alternative embodiment continue from this point as shown in FIGS. 2B–2G and as described above.

FIGS. 4A, 4B, 4C, and 4D are flowcharts showing the operation of the service provider during an embodiment of the present invention. The mobile station and the service provider take the steps shown in cooperation with each other to carry out the preferred embodiment of the present invention.

As shown in FIG. 4A, the service provider is in idle mode 400 and is awaiting a call from the mobile station. If the service provider receives USSD signals while awaiting a call from the mobile station 406, the service provider responds to those signals by sending a rejection signal or otherwise rejecting the signals 408, and returns to idle 400. As shown in FIG. 2A and described above, the mobile station calls the service provider 104. When the service provider receives a call from the mobile station 402, the service provider answers the call 404. This answering corresponds to the mobile station and the service provider connecting 120 as shown in FIG. 2B and described above. As shown in FIG. 4A, once the service provider answers the call 404, the service provider awaits a command from the mobile station 410.

If the service provider receives a disconnect indicator from the mobile station or disconnects for any other reason 412, the service provider does so and returns to idle mode 400. There are several points in the process at which the mobile station might disconnect the service provider. For example, as shown in FIG. 2B, if the multi-party connection attempt is not acknowledged 128, the connection between the mobile station and the service provider will be broken 130.

If the service provider receives a USSD signal that is not within the scope of is USSD signals it is directed to handle during the process 414, it will send a rejection signal or otherwise reject the USSD signal 416. Following this rejection 416, the service provider will continue waiting for commands 410 as before.

As described above, and shown at 150 in FIG. 2B, during the carrying out of an embodiment of the present invention, the mobile station will signal the service provider to begin screening the incoming call. When the service provider receives a command from the mobile station to begin screening 414, the service provider will play a greeting for the incoming caller 416. For example, the service provider plays the following message to the incoming caller: "Please state your name." After playing the greeting, or prompt, the service provider initiates recording the incoming caller's response 418. As shown in FIG. 4B, if the service provider is disconnected for any reason 420, the service provider will return to idle mode 400. The mobile station's reaction to or initiation of this disconnection is shown in FIG. 2C at 156. If the recording attempt fails 422, the service provider will communicate that the name collect failed to the mobile station 424. This communication is preferably completed using USSD. The mobile station's receipt of the service provider's communication of name collect failure is shown in FIG. 2C at 160 and described above. Once this communication is sent 424, the service provider disconnects 426 and returns to idle mode 400.

If the service provider successfully completes the recording of the incoming caller's response 428, the service provider communicates the completion to the mobile station 430 preferably using USSD. The mobile station's receipt of this communication is shown in FIG. 2C at 164. Once the communication is completed 430, the service provider returns to awaiting-commands mode 410.

As described above, during the mobile station's carrying out of the embodiment of the present invention, the mobile station may signal the service provider to handle an unanswered call. This signalling is shown in FIG. 2C at 182 and is described above. Referring to FIG. 4A, if, while waiting for commands 410, the service provider preferably receives a USSD signal to handle an unanswered call 432 from the mobile station, the service provider initiates its handling of the unanswered call 434. The call is then handled by the service provider 436. The service provider may record a voice message from the incoming caller. As seen in FIG. 4C, if the service provider is disconnected from the incoming caller for some reason 438, the service provider will stop handling the call 440 and will return to idle mode 400. Once the service provider completes its handling of the call 442 without a premature disconnection, the service provider disconnects from the incoming caller and the mobile station 444 and returns to idle mode 400. The disconnection of the service provider by the mobile station 185 is shown in FIG. 2F.

As described above, during the mobile station's carrying out of the embodiment of the present invention, the mobile station may signal the service provider to screen the incoming caller. This signalling to screen 214 is shown in FIG. 2D and is described above. If, while waiting for commands 410, the service provider receives a USSD signal to initiating screening 446 from the mobile station, the service provider will play the screening message 448 for the mobile station. For example, the service provider the service provider plays and the mobile station receives the following message: "Hello, [information provided by the caller] is holding. Would you like to accept the call?" Then, the service provider starts a timer 450 designated herein as T3. Timer T3 is used to govern the amount of time the service provider will wait for the mobile station to accept or reject the incoming call. Preferably, the timer is set to expire in approximately 3–6 seconds.

Then, the service provider awaits the mobile station's response to the screening message 452. The service provider's receipt of the screening message and consequent communication to the service provider of the response is described above and is shown in FIGS. 2D and 2E.

If the service provider is disconnected for any reason while awaiting the mobile station's response 458, the service provider will stop the timer T3 460. Then, the service provider will return to idle mode 400.

If the timer T3 expires before the mobile station user's response to the screening message is received 454, then the service provider initiates handling of the incoming call by the service provider 456. The unanswered incoming call is handled by the service provider in the manner described above and shown in FIG. 4C. For example, a voice message from the incoming caller to the mobile station user is recorded.

If a negative response, or a rejection, is received by the service provider from the mobile station 462, the service provider will stop the timer T3 464 and signal the mobile station that the call was rejected 466. This signal is preferably accomplished using USSD. The mobile station's receipt of such a signal is shown in FIG. 2E at 236. After signalling the mobile station 466, the service provider will return to awaiting-command mode 410. In the normal situation, the subsequent command from the mobile station will be that the service provider handle the unanswered call (shown in FIG. 2E at 266). In such a case, the service provider would carry out the necessary steps, beginning with the steps shown as 434 and 436 in FIG. 4A.

If an affirmative response, or an acceptance, is received by the service provider from the mobile station 468, the service provider will stop the timer T3 470. Next, the service provider signals the mobile station that the call was accepted 472 using USSD. The mobile station's receipt of such a signal is shown in FIG. 2E at 224. After signalling the mobile station regarding acceptance 472, the service provider returns to awaiting-command mode 410. In the normal situation, the subsequent command from the mobile station will be a disconnect command (shown at 296 in FIG. 2G) after the mobile station and the calling party are connected in a separate connection (shown in FIG. 2G at 282, 294 and described above).

The foregoing is provided for purposes of explanation and disclosure of a preferred embodiment of the present invention. Modifications of and adaptations to the described embodiment will be apparent to those of ordinary skill in the art of the present invention and may be made without departing from the scope or spirit of the invention and the following claims.

We claim:

1. A process for screening an incoming call from an incoming caller wherein the apparatus for carrying out the process comprises a mobile station and a service provider, said process comprising the following steps of:
   receiving at the mobile station the incoming call from the incoming caller;
   responsive to receiving the incoming call at the mobile station, further including the steps of:
      sending communication from the incoming caller to the service provider regarding the incoming caller;
      sending communication from the service provider to the mobile station regarding the incoming caller;
      wherein said communication comprises audio; and
      selecting one of a set comprising (1) accepting the incoming call and (2) rejecting the incoming call.

2. A process for screening an incoming call from an incoming caller, wherein the process is implemented in a mobile station, said process comprising the following steps of:
   a) receiving an incoming call from an incoming caller; responsive to receiving the incoming call, further including the steps of:
   b) placing said incoming caller on hold;
   c) communicating with a service provider;
   d) placing the service provider and the incoming caller on multi-party hold; and
   e) signalling the service provider to begin screening.

3. The process of claim 2, said process further comprising the following step:
   f) receiving communication from the service provider indicating information received from the incoming caller.

4. The process of claim 3, said process further comprising the following step:
   g) selecting one of a set comprising (1) accepting the call and (2) rejecting the call.

5. The process of claim 4, said process further comprising the following steps:
   h) in the event that accepting the call was selected in step g), disconnecting communication with the service provider; and
   i) in the event that rejecting the call was selected in step g), signalling the service provider that the service provider should handle the incoming call.

6. A process for screening an incoming call from an incoming caller, wherein the process is implemented in a service provider, said process comprising the following steps of:
   a) receiving communication from a mobile station indicating a desire to connect, responsive to the mobile station receiving an incoming call from an incoming caller;
   b) connecting with the mobile station;
   c) receiving communication from the mobile station to begin screening the incoming call from the incoming caller;
   d) collecting information regarding the incoming caller; and
   e) communicating information collected in step d) to the mobile station.

7. The process of claim 6, said process further comprising the following step:
   f) receiving communication from the mobile station indicating further action desired by a user of the mobile station.

8. The process of claim 7, said process further comprising the following step:
   g) communicating the further action desired by the mobile station's user to the mobile station.

9. The process of claim 8, said process further comprising the following step:
   h) in the event that the communication received in step f) indicates a desire to accept the call, disconnecting communication with the mobile station.

10. The process of claim 9, said process further comprising the following step:
    i) in the event that the communication received in step f) indicates a desire to reject the call, prompting the incoming caller for information.

11. The process of claim 10, said process further comprising the following step:
    j) disconnecting communication with the mobile station.

12. A process for screening an incoming call from an incoming caller wherein the apparatus for carrying out the process comprises a mobile station and a service provider, said process comprising the following steps of:
    a) receiving at the mobile station an incoming call from an incoming caller;
    b) at the mobile station, placing said incoming caller on hold;
    c) sending communication from the mobile station to a service provider indicating a desire to connect;
    d) receiving communication at the service provider from the mobile station indicating a desire to connect;
    e) connecting the mobile station and the service provider;
    f) placing the service provider and the incoming caller on multi-party hold;
    g) sending communication to the service provider from the mobile station signalling the service provider to begin screening;
    h) receiving communication from the mobile station at the service provider signalling the service provider to begin screening;
    i) collecting information from the incoming caller;
    j) sending communication regarding information collected in step i) from the service provider to the mobile station;
    k) receiving communication from the service provider to the mobile station regarding information collected in step i);
    l) selecting one of a set comprising (1) accepting the call and (2) rejecting the call;
    m) in the event that accepting the call was selected in step l), disconnecting the connection between the service provider and the mobile station; and
    n) in the event that rejecting the call was selected in step l), signalling the service provider that the service provider should handle the incoming call.

13. Apparatus for screening an incoming call for use in cellular telecommunications, said apparatus comprising:
    a service provider;
    and a mobile station adapted to receive an incoming call, the mobile station programmed to connect with the service provider responsive to receiving the incoming call;
    wherein said service provider is programmed to collect information regarding an incoming caller's identification and to communicate at least part of said information to said mobile station;
    and wherein said mobile station is programmed to receive communications from said service provider regarding said information and to communicate said information to a user of said mobile station,
    wherein said information comprises audio;
    whereby said user can select one of a set comprising (1) accepting the incoming call and (2) rejecting the incoming call.

14. The process of claim 1, said process further comprising the steps of:
    at the mobile station, initiating a timer, wherein the timer expires a predetermined amount of time after initiation; and
    responsive to the timer expiring, selecting one of a set comprising: (1) disconnecting the incoming call, (2) stopping a ringer in the mobile telephone from ringing, and (3) rejecting the incoming call.

15. The process of claim 2, said process further comprising the steps of:
    initiating a timer, wherein the timer expires a predetermined amount of time after initiation; and
    responsive to the timer expiring, selecting one of a set comprising: (1) disconnecting the incoming call, (2) stopping the mobile telephone from ringing, and (3) rejecting the incoming call.

16. The process of claim 15, said process further comprising the steps of:
    prior to initiating the timer, calling the service provider;
    prior to the timer expiring, receiving a message from the service provider responsive to calling the service provider;
    prior to the timer expiring, selecting one of a set comprising: (1) disconnecting the incoming call, and (2)

stopping the timer responsive to the message from the service provider; and responsive to stopping the timer, putting the incoming caller and the service provider in a multi-party hold.

17. The process of claim 6, said process further comprising the steps of:

initiating a timer, wherein the timer expires a predetermined amount of time after initiation; and responsive to the timer expiring, disconnecting the incoming call.

18. The process of claim 17, said process further comprising the steps of prior to the timer expiring, providing the mobile station with a screening message;

prior to the timer expiring, receiving a message from the mobile station responsive to providing the mobile station with the screening message;

prior to the timer expiring, selecting one of a set comprising: (1) signalling the incoming caller that the incoming call was rejected, and (2) signalling the mobile station that the incoming call was accepted.

* * * * *